United States Patent
Seo et al.

(10) Patent No.: US 11,625,187 B2
(45) Date of Patent: Apr. 11, 2023

(54) METHOD AND SYSTEM FOR INTERCEPTING A DISCARDED PAGE FOR A MEMORY SWAP

(71) Applicant: Research & Business Foundation Sungkyunkwan University, Suwon-si (KR)

(72) Inventors: Eui Seong Seo, Suwon-si (KR); Jong Seok Kim, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 182 days.

(21) Appl. No.: 17/136,644

(22) Filed: Dec. 29, 2020

(65) Prior Publication Data

US 2021/0200463 A1 Jul. 1, 2021

(30) Foreign Application Priority Data

Dec. 31, 2019 (KR) .......................... 10-2019-0179882

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC .... G06F 3/0604; G06F 3/0655; G06F 3/0679; G06F 12/0246; G06F 12/1009; G06F 12/123; G06F 16/2246; G06F 2212/1016; G06F 2212/7205; G06F 2212/7208
See application file for complete search history.

(56) References Cited

U.S. PATENT DOCUMENTS

| | | | |
|---|---|---|---|
| 2011/0087901 A1* | 4/2011 | Lo | G06F 9/4418 713/300 |
| 2014/0164686 A1* | 6/2014 | Choi | G06F 3/0647 711/105 |
| 2016/0188490 A1* | 6/2016 | Samih | G11C 7/1072 711/135 |
| 2017/0024326 A1* | 1/2017 | Luo | G06F 12/1009 |
| 2017/0285997 A1* | 10/2017 | Stabrawa | G06F 3/0604 |
| 2019/0258420 A1* | 8/2019 | Olderdissen | G06F 12/08 |

FOREIGN PATENT DOCUMENTS

| | | |
|---|---|---|
| KR | 10-2014-0121013 A | 10/2014 |
| KR | 10-2017-0092912 A | 8/2017 |

\* cited by examiner

*Primary Examiner* — Jane W Benner
(74) *Attorney, Agent, or Firm* — NSIP Law

(57) ABSTRACT

Provides is a method for memory swap. The method for memory swap according to the present disclosure may comprise storing a plurality of pages in a volatile memory; intercepting at least one page among the plurality of pages before the at least one page is discarded from the volatile memory; and compressing the at least one intercepted page and storing the compressed page in a memory swap space, wherein the plurality of pages include a first page, which is a clean page among file-mapped pages, and a second page, which is an anonymous page.

19 Claims, 10 Drawing Sheets

METHOD AND SYSTEM FOR INTERCEPTING A DISCARDED PAGE FOR A MEMORY SWAP

This application is based on and claims priority under 35 U.S.C. 119 to Korean Patent Application No. 10-2019-0179882, filed on Dec. 31, 2019, in the Korean Intellectual Property Office, the disclosure of which is herein incorporated by reference in its entirety.

BACKGROUND OF THE DISCLOSURE

Field of the Disclosure

The present disclosure relates to a method and a system for memory swap.

Related Art

Recently, as mobile computing devices are spreading rapidly, many methods are being developed to increase user satisfaction, which employs a device design capable of not only reducing computational power but also accelerating computational speed by utilizing resources as efficiently as possible under limited power availability.

In particular, considering the use pattern of computing devices, only a small number of applications are executed repeatedly, it is highly likely that a discarded file-mapped page is read again, and thereby the time required to read the page may bring an adverse effect on the user experience.

Therefore, for those computing devices with limited resources, there is a need for designing an efficient memory swap method in order to utilize the resources in the most efficient manner and, at the same time, to improve user satisfaction.

SUMMARY

An object of the present disclosure is to provide a method and a system for maximizing the use of limited resources of computing devices having the limited resources.

Also, an object of the present disclosure is to provide a method and a system for maximizing the use of limited resources of computing devices by storing not only anonymous pages but also clean pages among file-mapped pages in a memory swap space.

Also, an object of the present disclosure is to provide a method and a system for maximizing the use of limited resources of computing devices by selecting part of anonymous and clean pages according to a predetermined criterion and storing the selected pages in a memory swap space.

Also, an object of the present disclosure is to provide various criteria according to which to select pages to be removed from a memory swap space when the memory swap space is full.

Technical objects to be achieved by the present disclosure are not limited to those described above, and other technical objects not mentioned above may also be clearly understood from the descriptions given below by those skilled in the art to which the present disclosure belongs.

To solve the problem above, a method for memory swap according to the present disclosure may comprise storing a plurality of pages in a volatile memory; intercepting at least one page among the plurality of pages before the at least one page is discarded from the volatile memory; and compressing the at least one intercepted page and storing the compressed page in a memory swap space, wherein the plurality of pages include a first page, which is a clean page among file-mapped pages, and a second page, which is an anonymous page.

Also, the storing in a memory swap space may calculate a first profit for the at least one intercepted page and storing the at least one intercepted page into the memory swap space if the calculated first profit is larger than an average profit.

Also, if the at least one intercepted page is the first page, the first profit may be calculated by using Eq. 1.

$$\text{First profit} = \frac{\text{Cost}}{\text{Compression Ratio}}. \quad \text{[Eq. 1]}$$

(In Eq. 1, Cost is the value obtained by subtracting the "cost for writing a clean page into a memory" from the "cost expected when a page is written into a non-volatile memory and loaded again", and Compression Ratio is the compression ratio of a page.)

Also, the average profit may be calculated by Eq. 2.

$$\text{Average profit} = \text{Capacity} \times \frac{\text{Avg Cost} \times \text{Hit Rate}}{\text{Avg Compression Ratio}}. \quad \text{[Eq. 2]}$$

(In Eq. 2, Capacity is the fill ratio of the memory swap space, Avg Cost is the average cost, Hit Rate is the ratio of "the number of attempts to read a page from the memory swap space" to "the number of times the page attempted to be read from the memory swap space is found when the read is attempted", and Avg Compression Ratio is the average compression ratio.)

Also, the memory swap space may include a storage tree structure.

At this time, if the at least one intercepted page is the first page, the storage tree structure may match all of the at least one intercepted page to one tree.

At this time, the matched one tree may further include metadata for the at least one intercepted page.

The metadata may include an Mode number and a block device number.

The method for memory swap may further comprise deleting the first page when the at least one intercepted page is the first page and the memory swap space is full.

The method for memory swap may further comprise selecting a swap page to be removed from the memory swap space when the at least one intercepted page is the second page and the memory swap space is full.

The selecting a swap page to be removed from the memory swap space may select the swap page to be removed from the memory swap space to a swap file based on a Least Recently Used (LRU) list.

At this time, the selecting a swap page to be removed from the memory swap space may select a swap page at the most rear position of the LRU list.

The selecting a swap page to be removed from the memory swap space may select the swap page to be removed from the memory swap space to the swap file based on a criteria table including a first criterion to a third criterion.

At this time, the first criterion may be configured based on a free space within the swap page, the second criterion may be configured based on the number of zpages included in the swap page, and the third criterion may be configured based on the number of file-mapped pages included in the swap page.

The selecting a swap page to be removed from the memory swap space may generate a plurality of LRU lists, select one LRU list from the LRU lists by using lottery selection, and select a page to be removed from the memory swap space to the swap file based on the selected LRU list.

At this time, the lottery selection may be performed based on the $T_i$ value calculated by Eq. 3.

$$T_i = N_i \times W_i. \quad \text{[Eq. 3]}$$

(In Eq. 3, $N_i$ is the ratio of "the number of swap pages included in the corresponding list" to "the total number of swap pages", and $W_i$ is a weight value of each list.)

Also, the selecting a swap page to be removed from the memory swap space may select a swap page at the most rear position of the selected LRU list.

Also, the intercepting at least one page may intercept the at least one page before a kernel swap daemon is activated according to the occupancy rate of the volatile memory and the at least one page is discarded from the volatile memory by the activated kernel swap daemon.

To solve the problem above, the present disclosure may include a volatile memory, a non-volatile memory, and a processor controlling the volatile memory and the non-volatile memory, where the volatile memory includes a first storage space for storing a plurality of pages and a second storage space for storing at least one page intercepted from the plurality of pages; and the plurality of pages include a first page, which is a clean page among file-mapped pages, and a second page, which is an anonymous page.

At this time, the second storage space may store the at least one intercepted page when a first profit calculated for the at least one intercepted page is larger than an average profit.

Also, the second storage space may include a storage tree structure.

At this time, the storage tree structure may match all of the at least one intercepted page to one tree when the at least one intercepted page is the first page.

BRIEF DESCRIPTION OF THE DRAWINGS

The accompanying drawings, which are included herein as part of detailed descriptions to help understanding the present disclosure, provide embodiments of the present disclosure and describe technical features of the present disclosure with detailed descriptions below.

DESCRIPTION OF EXEMPLARY EMBODIMENTS

In what follows, embodiments disclosed in this document will be described in detail with reference to appended drawings, where the same or similar constituting elements are given the same reference number irrespective of their drawing symbols, and repeated descriptions thereof will be omitted. The suffixes, 'module' and 'unit', for the constituting elements used in the following descriptions are assigned or used interchangeably only for the convenience of writing the present document and do not have separate meanings or roles distinguished from each other. Also, in describing an embodiment disclosed in the present document, if it is determined that a detailed description of a related art incorporated herein unnecessarily obscure the gist of the embodiment, the detailed description thereof will be omitted. Also, it should be understood that the appended drawings are intended only to help understand embodiments disclosed in the present document and do not limit the technical principles and scope of the present disclosure; rather, it should be understood that the appended drawings include all of the modifications, equivalents or substitutes belonging to the technical principles and scope of the present disclosure.

Although terms including an ordinal number such as first or second may be used to describe various constituting elements of the present disclosure, the constituting elements are not limited by the terms. Those terms are used only for the purpose of distinguishing one constituting element from the others.

If a constituting element is said to be "connected" or "attached" to other constituting element, the former may be connected or attached directly to the other constituting element, but there may be a case in which another constituting element is present between the two constituting elements. On the other hand, if a constituting element is said to be "directly connected" or "directly attached" to other constituting element, it should be understood that there is no other constituting element between the two constituting elements.

A singular expression should be understood to indicate a plural expression unless otherwise explicitly stated.

In the present disclosure, the term "include" or "have" is used to indicate existence of an embodied feature, number, step, operation, constituting element, component, or a combination thereof; and should not be understood to preclude the existence or possibility of adding one or more other features, numbers, steps, operations, constituting elements, components, or a combination thereof.

In what follows, a method for memory swap according to a preferred, first embodiment of the present disclosure will be described in detail based on the descriptions given above.

Figure 1:
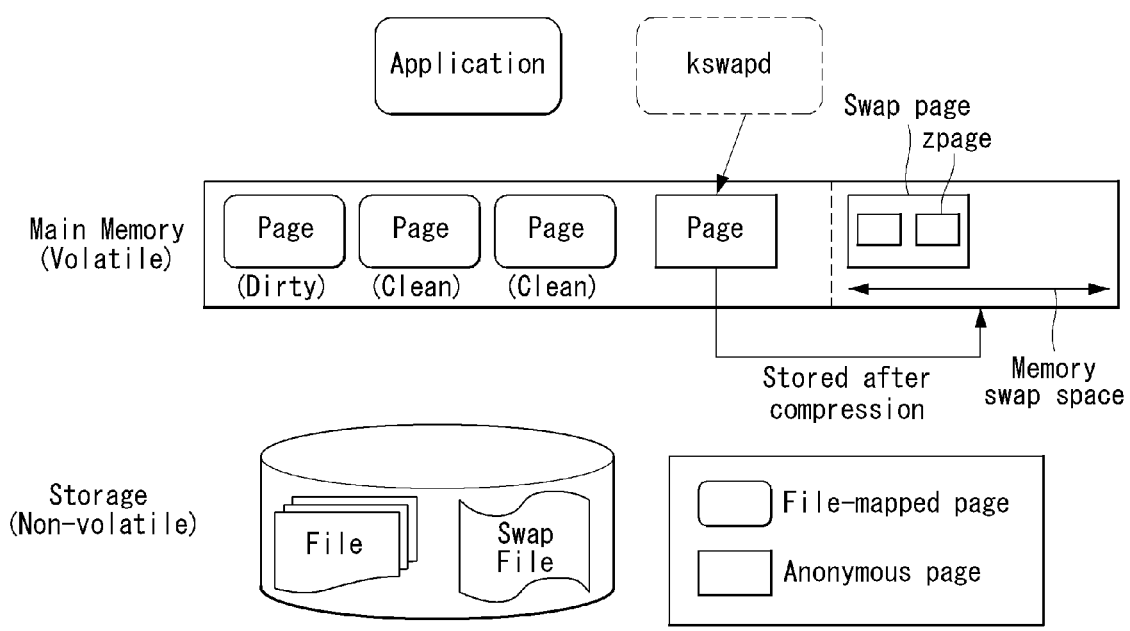
FIG. 1 illustrates a method for memory swap according to a first embodiment of the present disclosure.

FIG. 1 illustrates a method for memory swap according to a first embodiment of the present disclosure.

According to FIG. 1, a method for memory swap according to a first embodiment of the present disclosure may use a main memory and a storage. At this time, the main memory may indicate a volatile memory, and the storage may indicate a non-volatile memory.

The volatile memory 100 indicates a computer memory requiring electricity to maintain stored information unlike the non-volatile memory that does not require continuous supply of power, a typical example of which is a general-purpose Random Access Memory (RAM) such as a DRAM and an SRAM.

The non-volatile memory 200 may refer to a computer memory that holds stored information even if power is not supplied, typical examples of which include a ROM, a flash memory, a magnetic computer storage device (for example, a hard disk, a diskette drive, and a magnetic tape), and an optical disk drive.

According to FIG. 1, pages stored in the volatile memory 100 may include anonymous pages and file-mapped pages.

The anonymous page may refer to a page that is stored in the volatile memory 100 but is not mapped to the data stored in the non-volatile memory 200. Also, the file-mapped page may be regarded as being opposite of the anonymous page.

The file-mapped pages may include clean pages and dirty pages. Clean pages may refer to a case of the file-mapped page where there is no change of data stored in the non-volatile memory 200 after the file-mapped page is mapped to the data stored in the non-volatile memory 200. A dirty page may refer to a case of the file-mapped page where there is a change in the data stored in the non-volatile memory 200 after the file-mapped page is mapped to the data stored in the non-volatile memory.

According to FIG. 1, a kernel swap daemon (kswapd) may be activated depending on the occupancy rate of the volatile memory 100. When the kernel swap daemon is activated, the anonymous page is swapped out to a swap file of the system to reduce the occupancy rate of the volatile memory 100.

Referring to FIG. 1, before being stored into the swap file, the anonymous page may be intercepted and stored in a memory swap space set in the volatile memory 100. To store the anonymous page into the memory swap space, the anonymous page may be compressed.

According to FIG. 1, the memory swap space may include a swap page, and the swap page may include zpages.

For example, when pages are stored in the memory swap space, compressed pages may be stored in a page of 4 kbytes, where the page of 4 kbytes in the memory swap space may be referred to as a swap page. At this time, the compressed pages stored in the page of 4 kbytes of the memory swap space may be referred to as zpages. The present disclosure is not limited thereto.

Afterwards, if the memory swap space becomes full and the occupancy rate exceeds a predetermined value, a swap page may be selected to be removed from among the swap pages. At this time, the zpages included in the swap page to be removed may be decompressed and input into the swap file of the non-volatile memory 200.

In what follows, a method for memory swap according to a preferred, second embodiment of the present disclosure will be described in detail based on the descriptions given above.

In the description of the method for memory swap according to the preferred, second embodiment of the present disclosure, the same or repeated descriptions of the first embodiment will be omitted.

FIGS. 2 to 5 illustrate a method for memory swap according to a second embodiment of the present disclosure.

According to the preferred, first embodiment of the present disclosure, an application used in a computing device may mainly read file-mapped pages. In this case, since clean pages hold the same contents input to the non-volatile memory 200, a problem may occur that the clean pages are discarded first from the volatile memory.

Considering the use pattern of computing devices, users tend to use only a small number of applications repeatedly. Therefore, it is also preferable to load clean pages among the file-mapped pages after storing the clean pages in the memory swap space.

However, it may be difficult to sore clean pages in the memory swap space because of their large capacity and number of pages. Therefore, among the clean pages, it may be necessary to select particular clean pages to be stored in the memory swap space.

Figure 2:
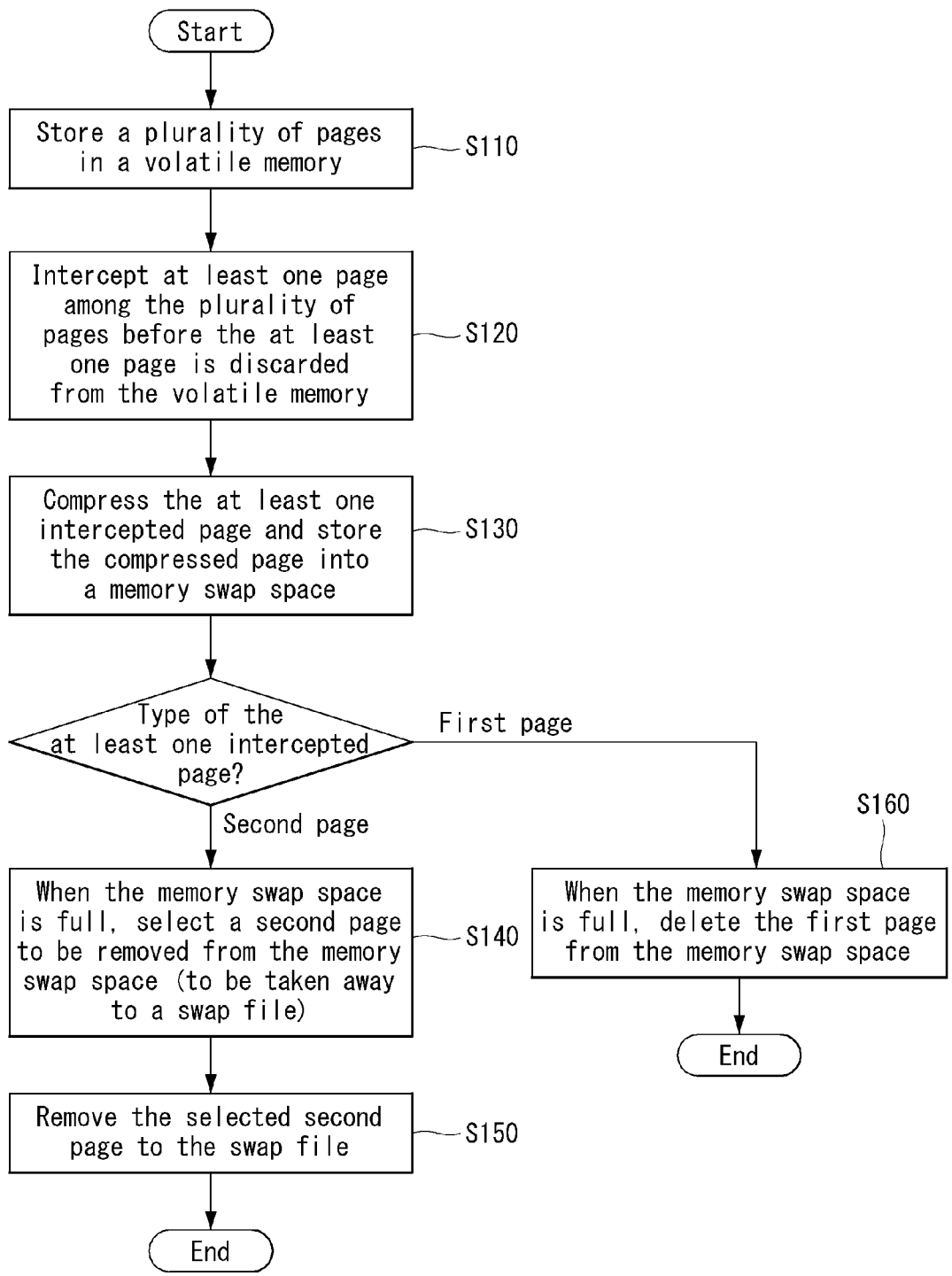
FIGS. 2 to 5 illustrate a method for memory swap according to a second embodiment of the present disclosure.

Referring to FIG. 2, a method for memory swap according to the second embodiment of the present disclosure may comprise storing a plurality of pages in the volatile memory 100, S110; intercepting at least one page among the plurality of pages before the at least one page is discarded from the volatile memory 100, S120; and compressing the at least one intercepted page and storing the compressed page in a memory swap space S130.

At this time, the plurality of pages may include a first page, which is a clean page among file-mapped pages, and a second page, which is an anonymous page.

Also, referring to FIG. 2, when the memory swap space becomes full, different steps may be taken depending on the type of the at least one intercepted page.

In other words, when the at least one intercepted page is the second page (anonymous page) and the memory swap space is full, the method for memory swap according to the present disclosure may further include selecting a second page to be removed from the memory swap space (to be taken away into a swap file) S140 and removing the selected second page into the swap file S150.

Also, when the at least one intercepted page is the first page (clean page) and the memory swap space is full, the method for memory swap according to the present disclosure may further include deleting the first page from the memory swap space. The deleting the first page is further included because the clean page is already stored in the non-volatile memory.

Figure 3:
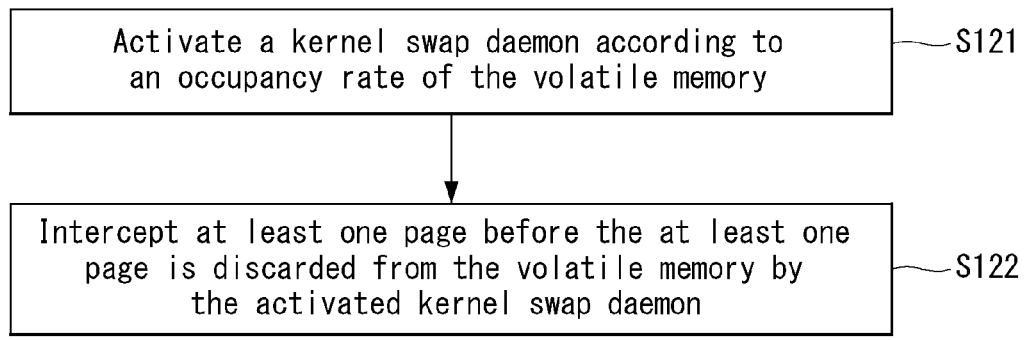

Referring to FIG. 3, the intercepting at least one page S120 may include activating a kernel swap daemon according to the occupancy rate of the volatile memory 100, S121 and intercepting at least one page before the at least one page is discarded by the activated kernel swap daemon from the volatile memory 100, S122.

Figure 4:
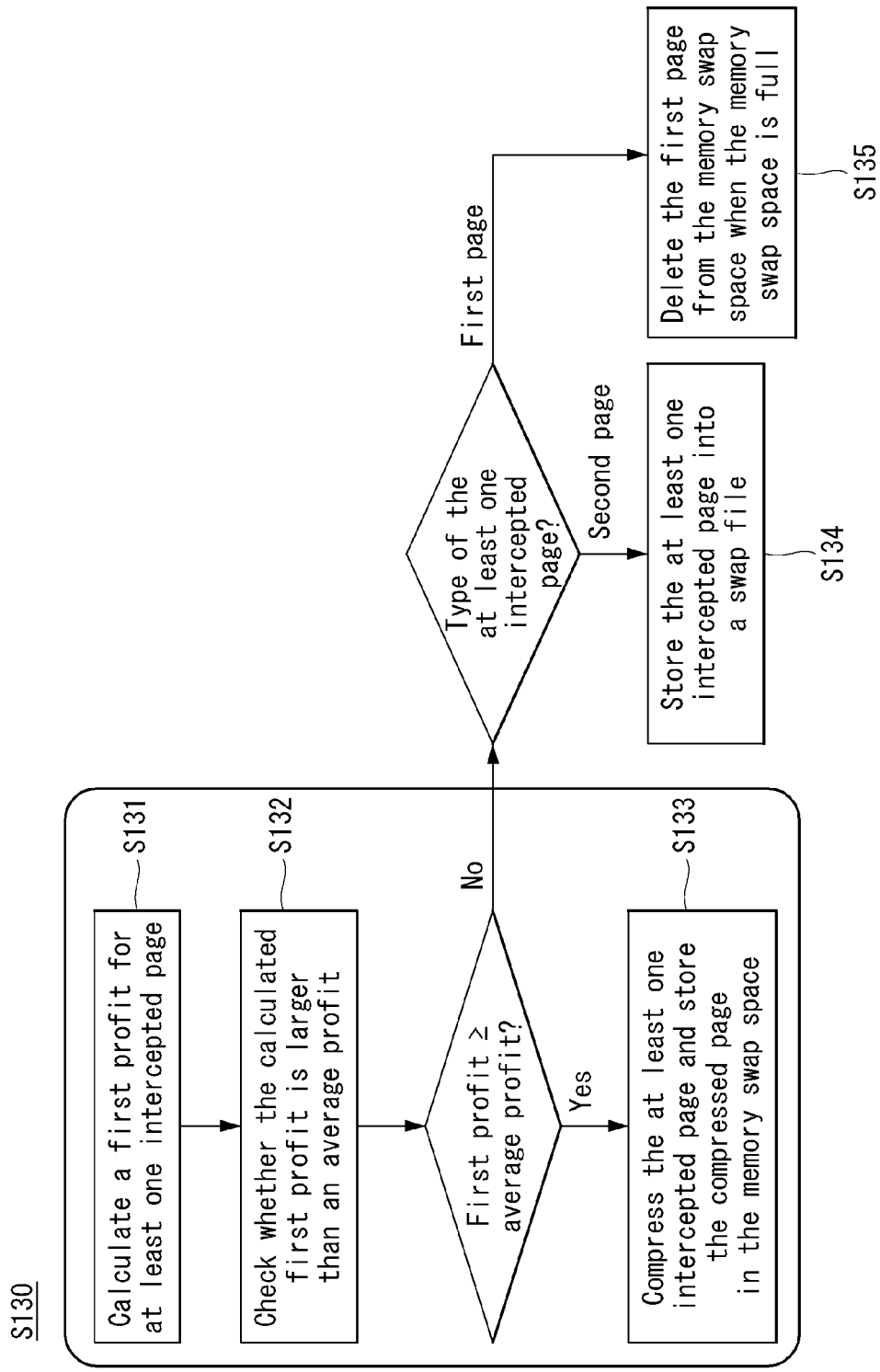

Referring to FIG. 4, the compressing at least one page and storing the compressed page in a memory swap space S130 may include calculating a first profit for the at least one intercepted page S131, checking whether the calculated first profit is larger than an average profit S132, and compressing the first page and storing the compressed first page in the memory swap space when the calculated first profit is larger than the average profit S133.

If the calculated first profit is less than the average profit, the second page may be stored into the swap file of the non-volatile memory 200 S134, or the first page may be deleted S135.

At this time, if the at least one intercepted page is the first page, the first profit may be calculated by using Eq. 1.

$$\text{First profit} = \frac{\text{Cost}}{\text{Compression Ratio}}. \quad [\text{Eq. 1}]$$

(In Eq. 1, Cost is the value obtained by subtracting the "cost for writing a clean page into a memory" from the "cost expected when a page is written into a non-volatile memory and loaded again", and Compression Ratio is the compression ratio of a page.)

The compression ratio may be obtained by calculating the entropy value of data samples for the page.

Also, the average profit may be calculated by Eq. 2.

$$\text{Average profit} = \text{Capacity} \times \frac{\text{Avg Cost} \times \text{Hit Rate}}{\text{Avg Compression Ratio}}. \quad [\text{Eq. 2}]$$

(In Eq. 2, Capacity is the fill ratio of the memory swap space, Avg Cost is the average cost, Hit Rate is the ratio of "the number of attempts to read a page from the memory swap space" to "the number of times the page attempted to be read from the memory swap space is found when the read is attempted", and Avg Compression Ratio is the average compression ratio.)

Figure 5:
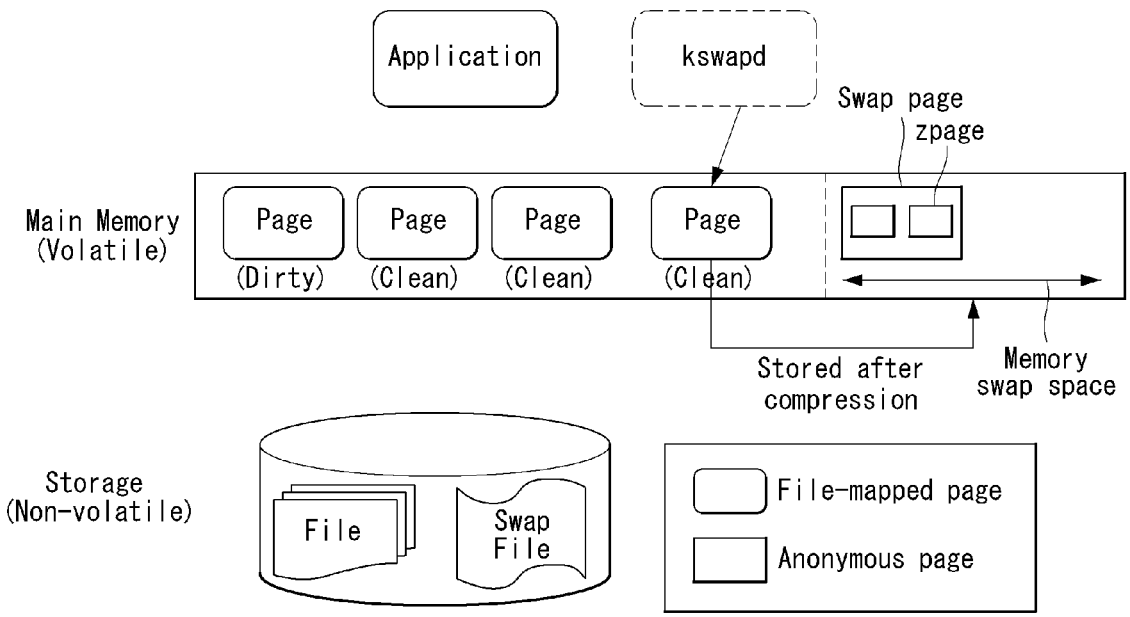

Referring to FIG. 5, the first page, which is a clean page, may be compressed and stored in the memory swap space. To store one swap page in the memory swap space, a plurality of the first pages may be compressed and stored.

In the same manner, the second page, which is an anonymous page, may be compressed and stored in the memory swap space. At this time, to store one swap page in the memory swap space, a plurality of the second pages may be compressed and stored.

At this time, the plurality of the first pages or the plurality of the second pages compressed and included in the swap page may be referred to as zpages.

Referring to FIG. 5, when the kernel swap daemon is activated, among the pages stored in the volatile memory 100, clean pages may be compressed and stored in the memory swap space. Since descriptions of the aforementioned process are the same as or repeat the descriptions given above, descriptions thereof will be omitted.

As described above, when the first page, which is a clean page, is stored in the memory swap space and an application has to read the first page, the first page stored in the memory swap space rather than the non-volatile memory 200 may be loaded. Through this operation, the first page may be loaded more quickly, which may affect fast execution of the application.

Figure 6:
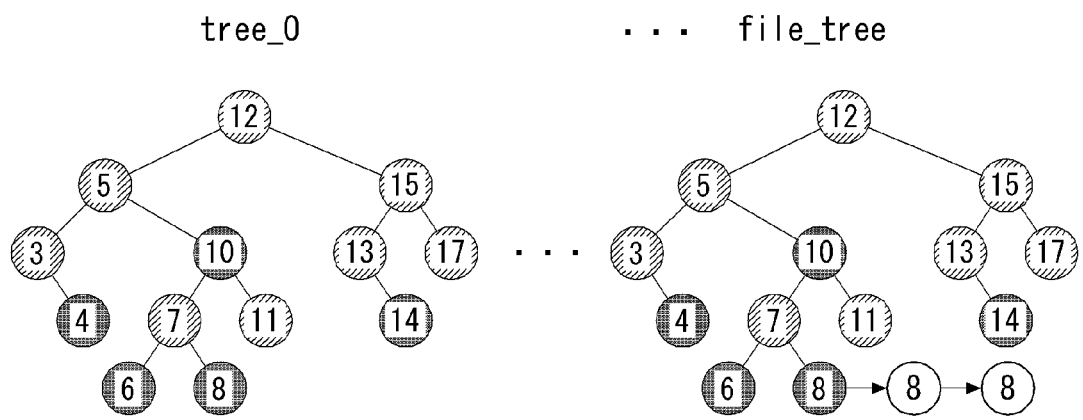
FIG. 6 illustrates a storage tree structure according to the second embodiment of the present disclosure.

FIG. 6 illustrates a storage tree structure according to the second embodiment of the present disclosure.

According to the first embodiment, the memory swap space stores only the second page. According to the second embodiment, since the memory swap space may further store the first page, modification of metadata may be required.

Metadata may refer to data for structuring data, which may mean data explaining other data. In other words, metadata may refer to attribute information including positions and contents of data to find desired data efficiently within a large amount of data.

According to the first embodiment, one swap file to which a swap page stored in the memory swap space may be matched to one tree. Since the number of swap files involved is not large when only anonymous pages are stored, swap files may be matched one-to-one to the trees.

According to the second embodiment, a large number of the first pages, namely, clean pages may be stored in a swap page stored in the memory swap space. Clean pages may belong to thousands to tens of thousands of files. Therefore, it may be difficult to provide trees that are matched one-to-one to the respective files.

Therefore, the method for memory swap according to the second embodiment of the present disclosure may match one tree to all of the files to which clean pages belong. In this case, since clean pages belonging to thousands to tens of thousands of files may be stored in one tree, modification of metadata may be required additionally.

Therefore, an Mode number and a block device number may be added to the metadata.

The Mode number may be a unique number for identifying each file within the file system of a non-volatile storage device.

The block device number may be a unique number for identifying a non-volatile storage device in which clean pages are stored.

As described above, by adding the Mode number and the block device number to the tree, pages belonging to different files may be found easily from a single tree. Referring to FIG. 6, circles with a number 8 are added at the end of the tree on the right side. Therefore, the system for memory swap may find a desired page through only one tree structure by finding a page at position 8 in the tree and searching the tree for circles of the files to which the corresponding page belongs by comparing Mode and block device numbers. Through this operation, an effect of reducing the memory for metadata may be obtained.

Figure 7:
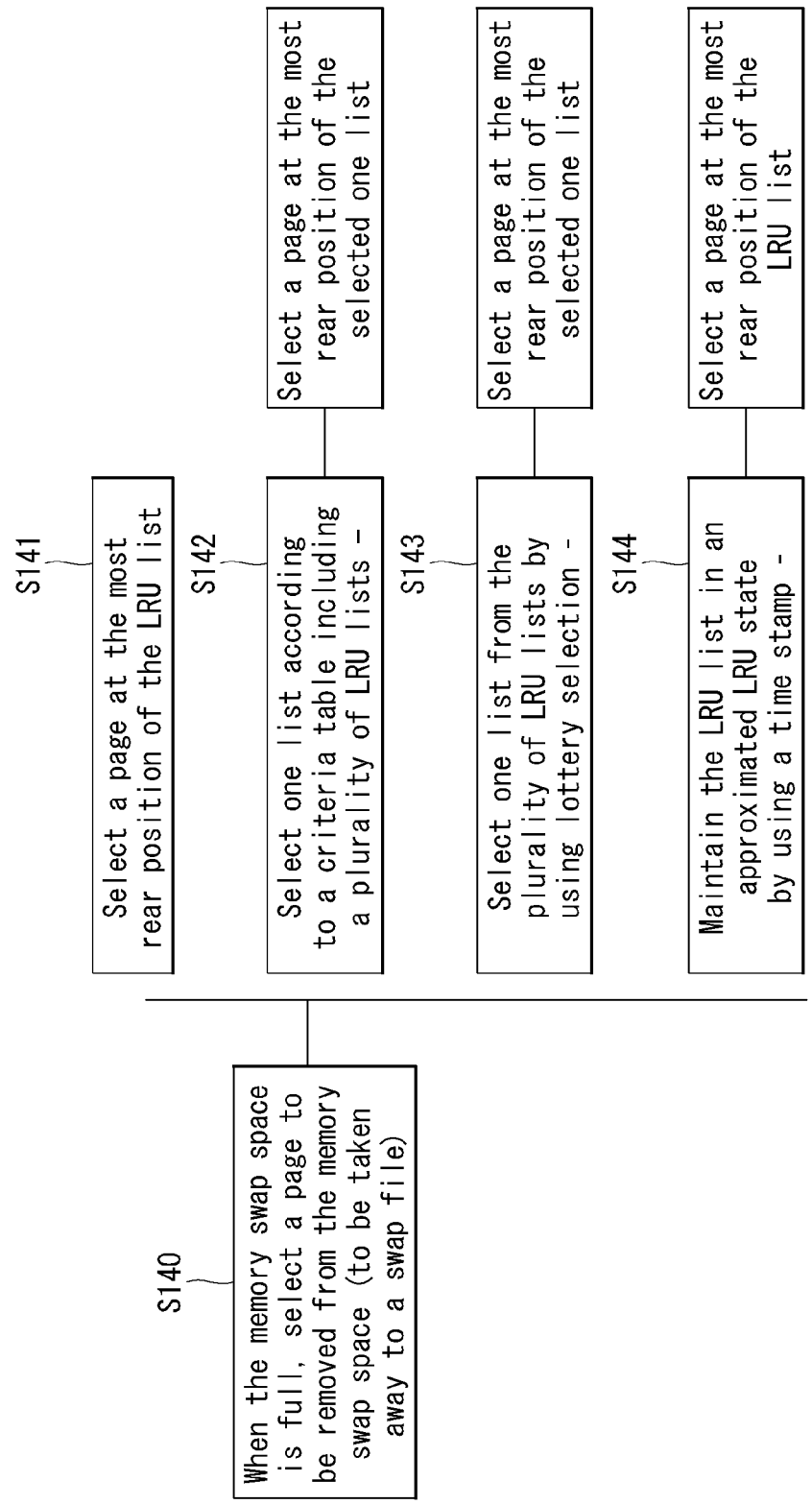
FIGS. 7 to 9 illustrate the S140 step according to the second embodiment of the present disclosure.
Figure 8:
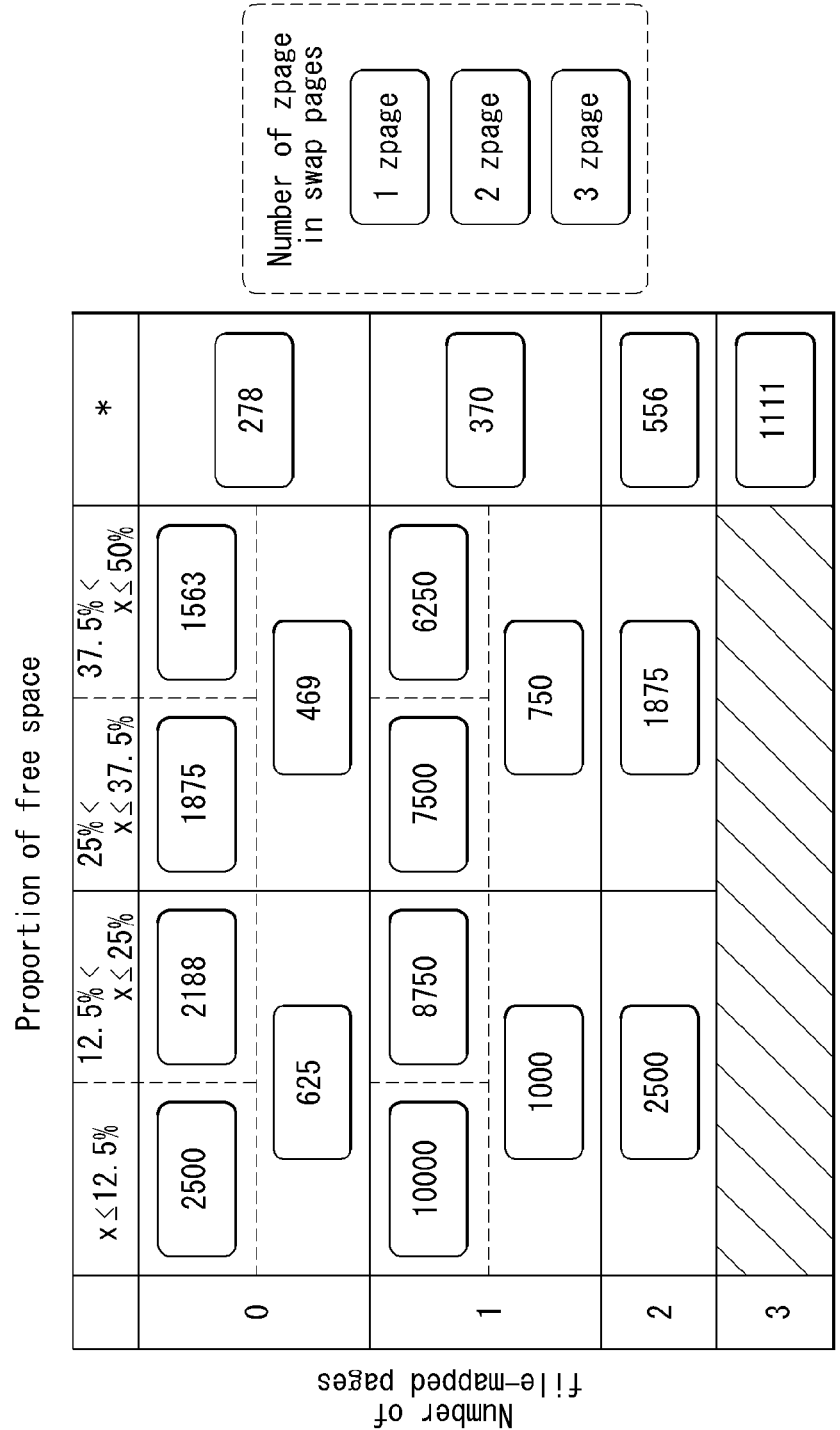
Figure 9:
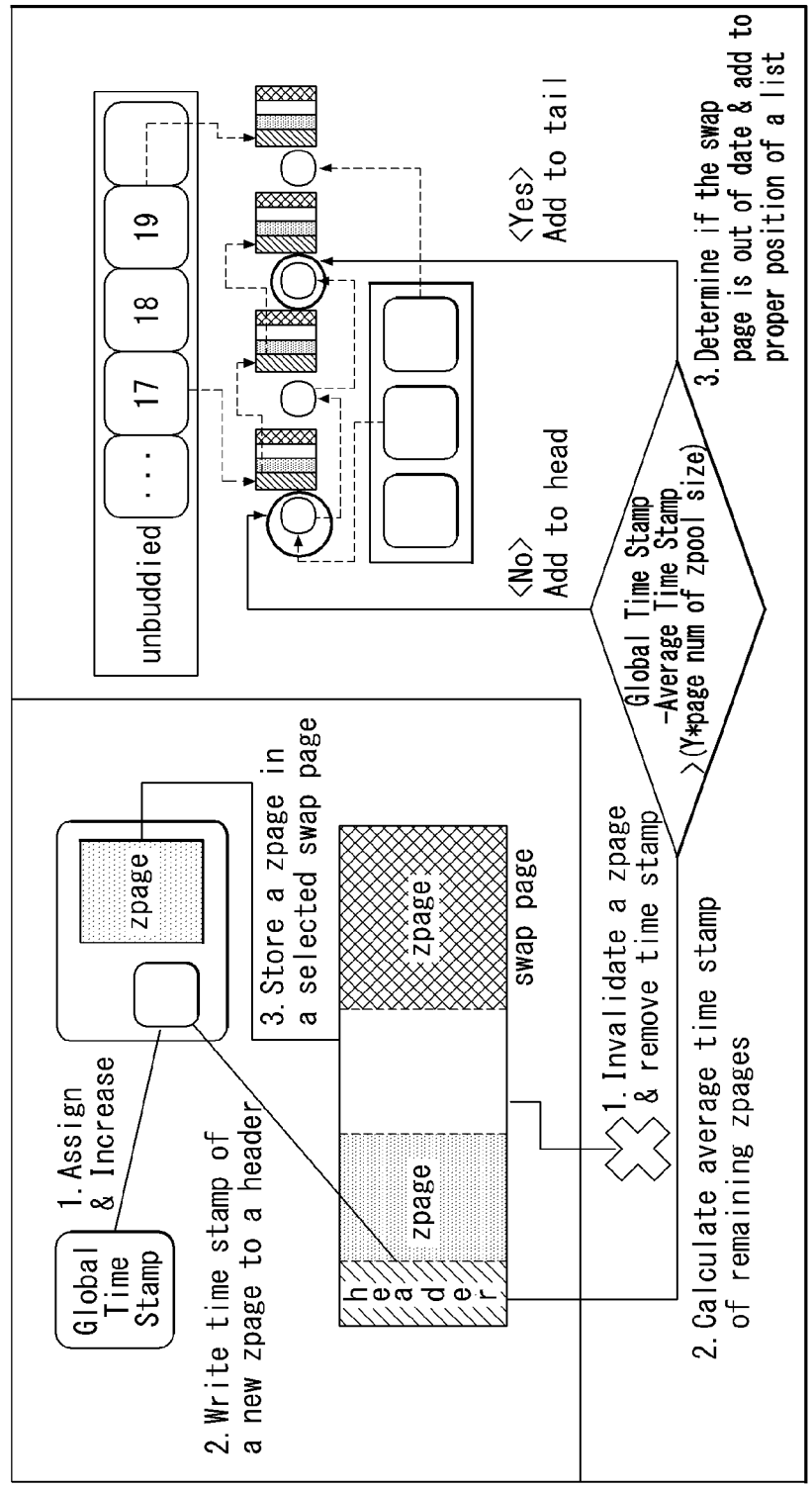

FIGS. 7 to 9 illustrate the S140 step according to the second embodiment of the present disclosure.

Referring to FIG. 7, the selecting a swap page to be removed from the memory swap space S140 may generate a Least Recently Used (LRU) list and select the swap page at the most rear position of the LRU list as a page to be removed from the memory swap space.

In other words, if a zpage included in the selected swap page is the second page (anonymous page), the zpage may be decompressed and removed into a swap file.

Also, if a zpage include in the selected swap page is the first page (clean page), the corresponding page may be deleted immediately.

The LRU list may be a list managed so that the longer a page has stayed in the memory swap space, the page is placed at a more rear part of the list whereas a newer page is placed at a more front part of the list. Therefore, one page at the most rear position of the LRU list may be selected, and the selected page may be removed to a swap file. At this time, an indicator of how long a page has stayed in the memory swap space may be referred to as the age of the page.

If pages are managed using only the LRU list, an advantageous effect may be obtained that a resulting algorithm is simplified; however, a disadvantageous effect may be obtained that it is difficult to consider the compression ratio of zpages compressed in the swap page.

In other words, because the compression ratio is not considered, the number of pages compressed in the memory swap space may be reduced. Because of this, a problem may occur that the hit rate may be reduced.

At this time, the hit rate may be obtained as follows.

$$\text{Hit Rate} = \frac{\text{The number of times that the first page and the second page are held in the memory swap space}}{\text{The number of read requests for the first page and the second page}}$$

Referring to FIG. 7, the selecting a swap page to be removed from the memory swap space S140 may select a swap page to be removed from the memory swap space based on a criteria table including a first to third criteria.

At this time, the first criterion may be configured based on the free space of a swap page swapped into the memory swap space, the second criterion may be configured based on the number of zpages included in the swap page, and the third criterion may be configured based on the number of file-mapped pages included in the swap page.

At this time, the criteria table may include a plurality of LRU lists; the plurality of LRU lists may be classified according to the first to third criteria; and the plurality of LRU lists may include the respective weight values.

FIG. 8 illustrates an example of a criteria table according to the second embodiment of the present disclosure.

According to FIG. 8, an example of a table is shown, where what was simply one LRU list is divided into 18 LRU lists.

The proportion of free space except for compressed zpages in one swap page is denoted by x on the horizontal axis of the criteria table. The vertical axis of the criteria table represents the number of file-mapped pages ranging from 0 to 3. Also, the respective lists may be divided into one of three types depending on the number of zpages (1 to 3) included in the swap page.

As one example, if one swap page includes two zpages, the free space within the swap page amounts to from 25% to 50%, and one of the zpages is a file-mapped page, the corresponding swap page may be included in a list with a weight value of 750.

As described above, each page may be determined in which list it may be included, weight values of the respective lists are compared with each other, and the list with the highest weight value is selected. At this time, it may be expected that the higher the weight value of each list, the larger the gain when the corresponding list is selected.

According to FIG. 8, the criteria table may determine a page to be removed by using the free space within the swap page, the number of zpages, and the number of file-mapped zpages.

According to the criteria table, the smaller the amount of the free space within the swap page and the smaller the number of zpages, the higher the possibility that the corresponding list is selected (namely, a greater gain is obtained). This is so because more free space may be obtained compared to the loss of the hit rate.

Also, as zpages within the swap page include more clean pages, the cost of removing the swap page becomes lower; therefore, if the same conditions are applied, it may be more advantageous to select a list in which more clean pages are compressed.

Therefore, the criteria table includes a total of 18 lists divided according to the number of zpages within the swap page, the number of clean pages, and the size of the free space. The respective lists may have a weight value to be used when pages to be removed are selected.

At this time, the weight value may be calculated by using the inverse value of Eq. 1.

$$\text{Weight value} = \frac{\text{Compression Ratio}}{\text{Cost}}.$$

(In the equation above, Cost represents a value obtained by subtracting "the cost of writing a clean page into a non-volatile memory" from "the cost expected when a page is written to the memory and loaded again therefrom", and Compression Ratio represents the compression ratio of the page.)

At this time, the Compression Ratio may use the lowest value of each interval.

As one example, if one of two zpages is a clean page and the proportion of the free space is 30%, the Compression Ratio becomes (75/2)%, and Cost becomes 1 and 4, respectively. In other words, $$\frac{1}{(1+4)/37.5} = 7.5.$$

Considering the nature of the kernel, since integer arithmetic is more preferable to floating-point arithmetic, 7.5 is multiplied by 100 to provide a weight value of 750.

As described above, the criteria table may be utilized to remove the page with the highest gain easily. However, a drawback may occur that when only the swap page at the most rear position of the corresponding list is removed, pages included in another list may not be selected properly. In this case, a problem may occur that older pages also continue to be stored in the memory swap space.

According to FIG. 7, the selecting a swap page to be removed from the memory swap space S140 may generate a plurality of LRU lists and select one from the generated LRU lists by using lottery selection.

At this time, the page at the most rear position in the selected list may be selected as a swap page to be removed from the memory swap space.

At this time, the lottery selection may use the $T_i$ value calculated by Eq. 3 as a criterion.

$$T_i = N_i \times W_i. \quad\quad [\text{Eq. 3}]$$

(In Eq. 3, $N_i$ is the ratio of "the number of swap pages included in the corresponding list" to "the total number of swap pages", and $W_i$ is the weight value of each list.)

At this time, $T_i$ may be assigned to each list. As $T_i$ becomes higher, the probability of selecting a list with a higher $T_i$ value grows. In other words, $T_i$ may indicate a tendency or a probability of being selected.

In this manner, by considering $T_i$, an effect may be obtained that not only the compression ratio and the cost may be determined through $W_i$, but also the age of a page may be determined through $N_i$.

According to FIG. 7, the selecting a swap page to be removed from the memory swap space S140 may maintain the LRU list in an approximated LRU state by using a time stamp and select a page at the most rear position in the LRU list maintained in the approximated LRU state. Detailed descriptions are given in FIG. 9.

FIG. 9 illustrates a method for using time stamps according to the second embodiment of the present disclosure.

According to FIG. 9, a time stamp may be used to maintain an LRU list in the approximated LRU state.

More specifically, a method for using time stamps according to the second embodiment of the present disclosure may use a global time stamp, which is a monotonically increasing integer, as the time stamp.

A time stamp may be assigned when a compressed first page (namely, a zpage) is stored in the memory swap space (in other words, when the zpage is compressed and included in a swap page). After the time stamp is assigned, the value of the time stamp may be increased by 1. In other words, a time stamp assigned later may have a larger value.

Swap pages may write a sum and an average of time stamp values of zpages in their header.

When a read request occurs for a zpage of a swap page, it may be said that a hit occurs. In this manner, the zpage for which a hit occurs may be invalidated. In the occurrence of an invalidated zpage, the time stamp of the invalidated zpage may be removed from the header of the swap page.

The sum and the average of time stamp values of the remaining pages except for the zpage for which a hit has occurred may be recalculated, and the recalculated sum and average may be written to the header of the swap page.

Based on the recalculated sum and average, the swap page may be moved to a new LRU list. At this time, it may be a problem whether the swap page should be positioned at the head or tail of the LRU list to which the swap page has moved.

If the average value recorded in the header of the swap page is less than the average of the entire time stamps of the LRU list to which the swap page has moved, the swap page may be positioned at the tail of the LRU list. On the other hand, if the average value recorded in the header of the swap page is larger than the average of the entire time stamps of the LRU list to which the swap page has moved, the swap page may be positioned at the head of the LRU list.

In this manner, since an LRU list is maintained to stay in the approximated LRU state by using the average value, an effect may be obtained that younger pages are positioned in the head portion of the LRU list, and older pages are positioned in the tail portion of the LRU list.

Figure 10:
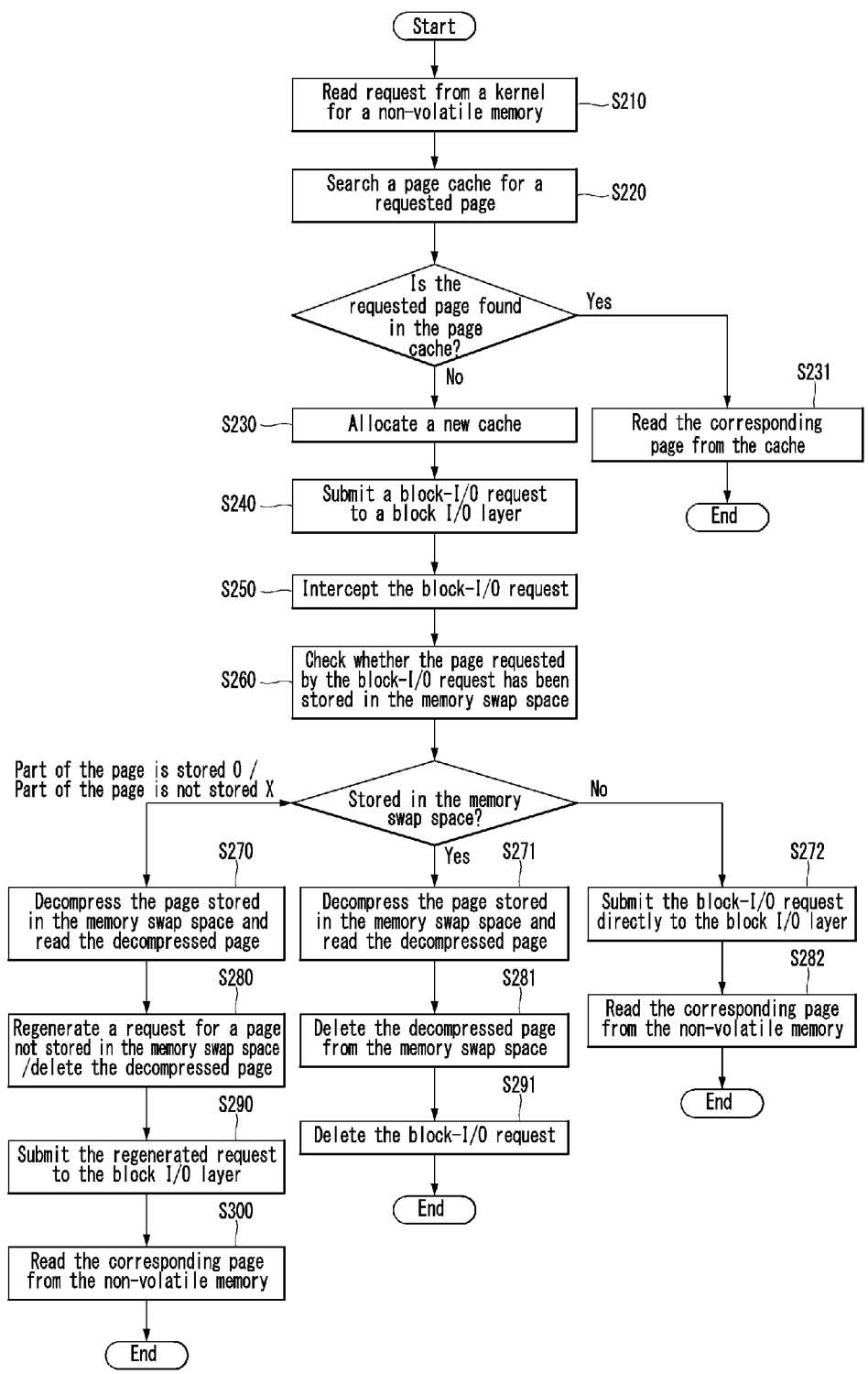
FIG. 10 illustrates the overall process for reading a desired page by a kernel using a method for memory swap according to the second embodiment of the present disclosure.

FIG. 10 illustrates the overall process for a kernel to read a desired page by using a method for memory swap according to the second embodiment of the present disclosure.

According to FIG. 10, the overall process for reading a desired page by using a method for memory swap according to the second embodiment of the present disclosure may include receiving a read request from the kernel for a desired page of a non-volatile memory S210 and searching a page cache for the requested page S220.

If the requested page exists in the page cache, the requested page may be read from the page cache S231.

Meanwhile, if the requested page is not found in the page cache, the kernel may allocate a new page cache S230 and submit a block-I/O request to the block I/O layer S240. At this time, the block-I/O request may be intercepted S250, and it may be checked whether the page requested by the intercepted block-I/O request has been stored in the memory swap space S260.

If it is found that the requested page is not stored in the memory swap space, the intercepted block-I/O request may be submitted directly to the block I/O layer S272, and in this case, the kernel may read the requested page from the non-volatile memory 200, S282.

Also, when the requested page is stored in the memory swap space, the page stored in the memory swap space may be decompressed, and the decompressed page may be read S271; the decompressed page may be deleted from the memory swap space S281, and the block-I/O request may be deleted S291.

Similarly, when only part of the requested page is stored in the memory swap space, the page stored in the memory swap space is decompressed, and the decompressed page may be read S270; a request for the page not stored in the memory swap space is regenerated, and the decompressed page may be deleted S280; the regenerated request may be submitted to the block I/O layer S290; and the corresponding page may be read from the non-volatile memory 200, S300.

In this manner, an advantageous effect may be obtained that by utilizing the memory swap space in a proper manner, a waste of resources may be reduced, and execution of applications may be speeded up.

In what follows, a system for memory swap according to a preferred, third embodiment of the present disclosure will be described in detail based on the descriptions give above.

In the description of the system for memory swap according to the preferred, third embodiment of the present disclosure, the same or repeated descriptions of the first and the second embodiment will be omitted.

Also, the system for memory swap according to the preferred, third embodiment of the present disclosure may use the method for memory swap according to the first and the second embodiment.

Figure 11:
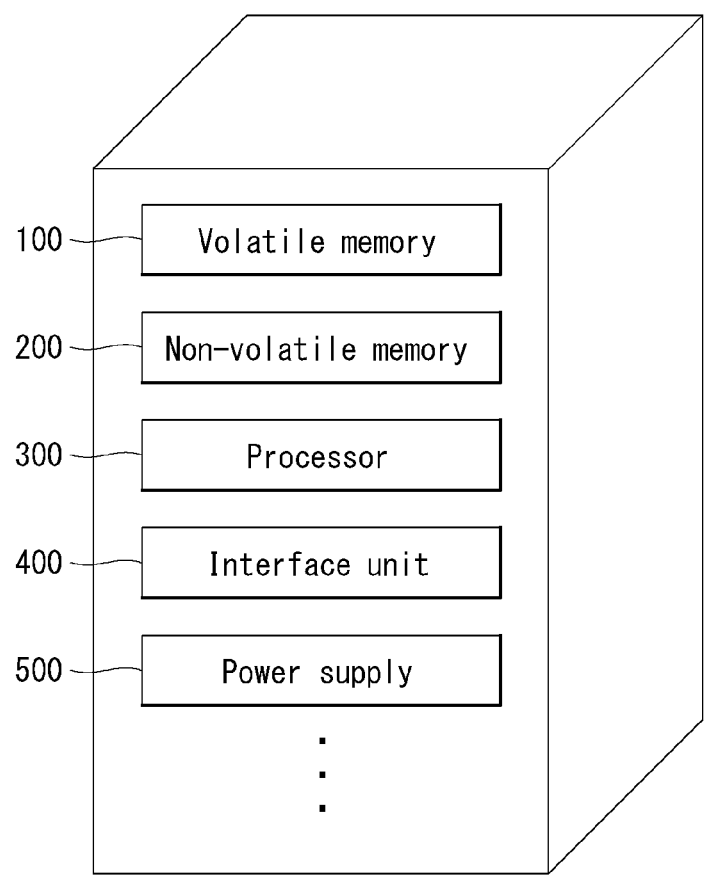
FIG. 11 illustrates a system for memory swap according to a third embodiment of the present disclosure.

FIG. 11 illustrates a system for memory swap according to a third embodiment of the present disclosure.

According to FIG. 11, a system for memory swap according to the third embodiment of the present disclosure may include a volatile memory 100, a non-volatile memory 200, a processor 300, an interface unit 400, and a power supply 500.

At this time, since descriptions of the volatile memory 100 and the non-volatile memory 200 are the same as or repeat the descriptions already given with reference to the first embodiment, descriptions thereof will be omitted.

The processor 300 is configured to perform computations and control other units. In most cases, the units may refer to a Central Processing Unit (CPU), an Application Processor (AP), and a Graphics Processing Unit (GPU). Also, the CPU, AP, or GPU may include one or more cores therein and may operate using an operating voltage and a clock signal. It should be noted, however, that while the CPU or the AP are composed of several cores optimized for serial processing, the GPU may be composed of thousands of smaller and more efficient cores designed for parallel processing.

The power supply 500 may indicate all types of configurations capable of supplying power to the system for memory swap according to the third embodiment of the present disclosure. The power supply 500 may provide AC or DC power. Also, the power supply 500 may include a converter capable of converting power into any desired type of power.

The volatile memory 100 may include a first storage space storing a plurality of pages and a second storage space storing a first page intercepted from the plurality of pages. At this time, the second storage space may mean the memory swap space in the first and the second embodiment described above.

The first page may refer to a clean page among file-mapped pages.

Also, the second storage space may store the first page when a first profit for the intercepted first page is larger than an average profit.

At this time, the first profit may be calculated by using Eq. 1.

$$\text{First profit} = \frac{\text{Cost}}{\text{Compression Ratio}}. \quad \text{[Eq. 1]}$$

(In Eq. 1, Cost is the value obtained by subtracting the "cost for writing a clean page into a memory" from the "cost expected when a page is written into a non-volatile memory and loaded again", and Compression Ratio is the compression ratio of a page.)

Also, the average profit may be calculated by Eq. 2.

$$\text{Average profit} = \text{Capacity} \times \frac{\text{Avg Cost} \times \text{Hit Rate}}{\text{Avg Compression Ratio}}. \quad \text{[Eq. 2]}$$

(In Eq. 2, Capacity is the fill ratio of the memory swap space, Avg Cost is the average cost, Hit Rate is the ratio of "the number of attempts to read a page from the memory swap space" to "the number of times the page attempted to be read from the memory swap space is found when the read is attempted", and Avg Compression Ratio is the average compression ratio.)

There are a multiple number of first pages, and the second storage space may be built based on a storage tree structure. At this time, the storage tree structure may be constructed so that a plurality of first pages are matched to one tree. Also, the storage tree structure may further include metadata about the plurality of first pages matched to one tree, and the plurality of first pages may be compressed to be stored.

The metadata may include an Mode number and a block device number. Since descriptions of the Mode number and the block device number are the same as or repeat the descriptions already given with reference to the first and the second embodiment, the descriptions thereof will be omitted.

When the second storage space is full, the processor 300 may select a swap page to be removed from the second storage space. The processor 300 may generate a Least Recently Used (LRU) list and select a page at the most rear position of the generated LRU list as the swap page to be removed from the second storage space.

Also, the processor 300 may select a swap page to be removed from the second storage space based on a criteria table including a first criterion to a third criterion. At this time, since descriptions of the first to third criteria are the same as or repeat the descriptions already given with reference to the first and the second embodiment, the descriptions thereof will be omitted.

Also, the processor 300 may generate a plurality of LRU lists, select one among the plurality of LRU lists by using lottery selection, and select a page at the most rear position in the selected LRU list as the page to be removed from the second storage space to a swap file. At this time, since the descriptions of the lottery selection are the same as or repeat the descriptions already given with reference to the first and the second embodiment, the descriptions thereof will be omitted.

In addition to the above, although not described in the third embodiment of the present disclosure, the descriptions given with reference to the first and the second embodiment may be implemented by the system for memory swap.

Meanwhile, the present disclosure described above may be implemented in the form of computer-readable code in a recording medium storing programs. The computer-readable recording medium includes all kinds of recording devices storing data that may be read by a computer system. Examples of computer-readable recording media include a Hard Disk Drive (HDD), a Solid State Disk (SSD), a Silicon Disk Drive (SDD), a ROM, a RAM, a CD-ROM, a magnetic tape, a floppy disk, an optical data storage device, and implementation in the form of carrier waves (for example, transfer through the Internet). Therefore, the detailed descriptions above should be regarded as being illustrative rather than restrictive in every aspect. The technical scope of the present disclosure should be determined by a reasonable interpretation of the appended claims, and all of the modifications that fall within an equivalent scope of the present disclosure belong to the technical scope of the present disclosure.

The present disclosure has been described with reference to the embodiments above; however, it should be understood by those skilled in the art to which the present disclosure belongs that the embodiments above are used merely for illustrating technical principles of the present disclosure and do not limit the technical scope of the present disclosure; and various modification and applications of the embodiments not described above are possible without departing from the inherent features of the present embodiments. For example, each individual constituting element illustrated specifically in the corresponding embodiment may be implemented after being modified properly. And it should be understood that those differences related to the modifications and applications are included in the technical scope of the present disclosure defined by the appended claims.

The present disclosure provides an effect of maximizing the use of limited resources of computing devices having the limited resources.

Also, the present disclosure provides an effect of maximizing the use of limited resources of computing devices by storing not only anonymous pages but also clean pages among file-mapped pages in a memory swap space.

Also, the present disclosure provides an effect of maximizing the use of limited resources of computing devices by selecting part of pages from anonymous pages and clean pages according to predetermined criteria and storing the selected pages in a memory swap space.

Also, the present disclosure may provide various criteria according to which to select pages to be removed from a memory swap space when the memory swap space is full.

The advantageous effects that may be achieved from the present disclosure are not limited to those described above, and other effects not mentioned above may also be clearly understood from the descriptions given below by those skilled in the art to which the present disclosure belongs.

What is claimed is:

1. A method for memory swap, the method comprising:
storing a plurality of pages in a volatile memory;
intercepting at least one page among the plurality of pages before the at least one page is discarded from the volatile memory; and
compressing the at least one intercepted page and storing the compressed page in a memory swap space,
wherein the plurality of pages include a first page, which is a clean page among file-mapped pages, and a second page, which is an anonymous page, and
wherein the storing in the memory swap space comprises:
calculating a first profit for the at least one intercepted page comparing the calculated first profit to an average profit to selectively store the first page or the second page,
when the calculated first profit is equal to or greater than the average profit, storing the first page in the memory swap space; and
when the calculated first profit is less than the average profit, storing the second page in the memory swap space.

2. The method of claim 1, wherein the first profit is calculated by using a value obtained by subtracting a cost for writing a clean page into a memory from a cost expected when the second page is written into a non-volatile memory and loaded again, and a compression ratio of the first page or the second page.

3. The method of claim 2, wherein the compression ratio is based on entropy values of data samples for the first page or the second page.

4. The method of claim 1, wherein the average profit is calculated by using a fill ratio of the memory swap space, an average cost, a ratio of a number of attempts to read a page from the memory swap space to a number of times the page attempted to be read from the memory swap space is found when the read is attempted, and an average compression ratio of the plurality of pages.

5. The method of claim 1, wherein the memory swap space includes a storage tree structure.

6. The method of claim 5, wherein, if the at least one intercepted page is the first page, the storage tree structure matches all of the at least one intercepted page to one tree.

7. The method of claim 6, wherein the matched one tree further includes metadata for the at least one intercepted page.

8. The method of claim 7, wherein the metadata includes an inode number and a block device number.

9. The method of claim 1, further comprising deleting the first page when the at least one intercepted page is the first page and the memory swap space is full.

10. The method of claim 1, wherein the intercepting at least one page intercepts the at least one page before a kernel swap daemon is activated according to an occupancy rate of the volatile memory and the at least one page is discarded from the volatile memory by the activated kernel swap daemon.

11. The method of claim 1, further comprising selecting a swap page to be removed from the memory swap space when the at least one intercepted page is the second page and the memory swap space is full.

12. The method of claim 11, wherein the selecting a swap page to be removed from the memory swap space selects the swap page to be removed from the memory swap space based on a Least Recently Used (LRU) list.

13. The method of claim 12, wherein the selecting a swap page to be removed from the memory swap space selects a swap page at a most rear position of the LRU list.

14. The method of claim 11, wherein the selecting a swap page to be removed from the memory swap space selects the swap page to be removed from the memory swap space based on a criteria table including at least one of a first criterion, second criterion, and a third criterion.

15. The method of claim 14, wherein the first criterion is configured based on a free space within the swap page, the second criterion is configured based on a number of zpages included in the swap page, and the third criterion is configured based on a number of file-mapped pages included in the swap page.

16. The method of claim 11, wherein the selecting a swap page to be removed from the memory swap space generates a plurality of LRU lists, selects one LRU list from the LRU lists by using lottery selection, and selects the swap page to be removed from the memory swap space based on the selected LRU list.

17. The method of claim 16, wherein the lottery selection is performed based on a value calculated by using a ratio of a number of swap pages included in the plurality of LRU lists to a total number of swap pages and a weight value of each of the plurality of LRU lists.

18. The method of claim 16, wherein the selecting a swap page to be removed from the memory swap space selects a swap page at a most rear position of the selected LRU list.

19. A system for memory swap, the system comprising:
a volatile memory;
a non-volatile memory; and
a processor configured to control the volatile memory and the non-volatile memory,
wherein the volatile memory includes a first storage space for storing a plurality of pages; and
a second storage space for storing at least one page intercepted from the plurality of pages,
wherein the plurality of pages include a first page, which is a clean page among file-mapped pages, and a second page, which is an anonymous page, and
wherein the processor calculates a first profit for the at least one intercepted page and compares the calculated first profit to an average profit to selectively store the first page or the second page,
when the calculated first profit is equal to or greater than the average profit, the first page is stored in the second storage space; and
when the calculated first profit is less than the average profit, the second page is stored in the second storage space.

* * * * *